United States Patent
Lamiable et al.

(10) Patent No.: US 10,428,956 B2
(45) Date of Patent: Oct. 1, 2019

(54) PRESSURE REDUCER WITH CAP-SHAPED MOVABLE CHAMBER

(71) Applicant: Luxembourg Patent Company S.A., Lintgen (LU)

(72) Inventors: Morgan Lamiable, Metzervisse (FR); Adrien Zoda, Zoufftgen (FR)

(73) Assignee: LUXEMBOURG PATENT COMPANY S.A., Lintgen (LU)

( * ) Notice: Subject to any disclaimer, the term of this patent is extended or adjusted under 35 U.S.C. 154(b) by 105 days.

(21) Appl. No.: 15/121,106

(22) PCT Filed: Feb. 18, 2015

(86) PCT No.: PCT/EP2015/053398
§ 371 (c)(1),
(2) Date: Aug. 24, 2016

(87) PCT Pub. No.: WO2015/128234
PCT Pub. Date: Sep. 3, 2015

(65) Prior Publication Data
US 2017/0067563 A1    Mar. 9, 2017

(30) Foreign Application Priority Data

Feb. 27, 2014   (LU) .......................................... 92383

(51) Int. Cl.
*G05D 16/10* (2006.01)
*F16K 31/122* (2006.01)
(Continued)

(52) U.S. Cl.
CPC .............. *F16K 1/304* (2013.01); *F16K 1/307* (2013.01); *F16K 1/50* (2013.01); *F16K 31/1221* (2013.01);
(Continued)

(58) Field of Classification Search
CPC ......... Y10T 137/7808; Y10T 137/7822; Y10T 137/7782; Y10T 137/7793; F16K 31/1221;
(Continued)

(56) References Cited

U.S. PATENT DOCUMENTS 6,047,727 A     4/2000   Hatori et al.
6,056,006 A *   5/2000   Hagerty ............... G05D 16/103
                                              137/269

(Continued)

FOREIGN PATENT DOCUMENTS

DE      19825460 C1   6/1999
EP       0112765 A1   7/1984
(Continued)

OTHER PUBLICATIONS

PCT International Preliminary Report on Patentability dated Sep. 15, 2016 from related EP App. No. 2015/053398, 7 pages.
(Continued)

*Primary Examiner* — Jessica Cahill
(74) *Attorney, Agent, or Firm* — James E. Walton

(57) ABSTRACT

The invention is directed to a device (2) for regulating the pressure and/or flow of pressurized gas, comprising a body (4) with a gas inlet (6), a gas outlet (8) and a gas passage (10, 26) connecting the outlet (8) with the inlet (6), a gas shut-off device comprising a seat (22) in the passage (10) and a movable closure element (24) cooperating with said seat (22) and a piston (12) carrying the closure element (24) and delimiting with the body (4) a low pressure chamber (28) downstream of the shut-off device (22, 24). The body (4) comprises a first portion ($4^1$) with the seat (22) and the inlet (6) and a second portion ($4^2$) housing the piston (12) and delimiting the low pressure chamber (28). The second (Continued)

portion ($4^2$) is movable relative to the first portion (41) between a closed position, and an open position.

15 Claims, 2 Drawing Sheets

(51) Int. Cl.
    *F16K 35/02*     (2006.01)
    *F16K 1/30*     (2006.01)
    *F16K 1/50*     (2006.01)

(52) U.S. Cl.
    CPC ...... *F16K 31/1223* (2013.01); *F16K 31/1226* (2013.01); *F16K 35/027* (2013.01); *G05D 16/103* (2013.01)

(58) Field of Classification Search
    CPC .. F16K 31/1223; F16K 31/1226; F16K 1/304; F16K 1/307; F16K 1/50; F16K 35/027; G05D 16/103
    See application file for complete search history.

(56) References Cited

U.S. PATENT DOCUMENTS

| | | | |
|---|---|---|---|
| 7,828,009 B2* | 11/2010 | Neumann | G05D 16/106 137/505.25 |
| 8,439,064 B2* | 5/2013 | Maus | F16K 17/10 137/505.25 |
| 2004/0007269 A1 | 1/2004 | Larsen | |
| 2004/0107966 A1* | 6/2004 | Joachimsthaler | A61M 16/208 128/204.26 |
| 2005/0103383 A1* | 5/2005 | Carroll | G06Q 10/10 137/505.28 |
| 2006/0231142 A1* | 10/2006 | Schwartz | F17C 13/04 137/505.25 |
| 2008/0011361 A1* | 1/2008 | Larsen | G05D 16/103 137/528 |
| 2009/0071550 A1* | 3/2009 | Patterson | G05D 16/103 137/523 |
| 2009/0126737 A1* | 5/2009 | Aubonnet | A62B 7/14 128/204.29 |
| 2010/0101666 A1* | 4/2010 | Pechtold | F16K 17/30 137/505 |
| 2012/0181287 A1* | 7/2012 | Holbeche | F17C 13/04 220/582 |

FOREIGN PATENT DOCUMENTS

| | | |
|---|---|---|
| WO | 2004052077 A2 | 6/2004 |
| WO | 2007149882 A2 | 12/2007 |

OTHER PUBLICATIONS

International Search Report dated May 28, 2015 for parent PCT application PCT/EP2015/053398.

* cited by examiner

PRESSURE REDUCER WITH CAP-SHAPED MOVABLE CHAMBER

TECHNICAL FIELD

The invention is directed to devices for regulating the pressure and/or the flow of compressed gas. More particularly, the invention is directed to such devices for inter alia industrial and calibration gases.

BACKGROUND ART

Prior art patent document published WO 2004/052077 A2 discloses a pressure reducer for a heliox mixture compressed in a cylinder. The pressure reducer serves also as shut-off valve and is kept in a shut-off position by a stem that urges the piston and the closure element thereof against the seat. A control knob disposed on the top of the device actuates the position of the stem so that upon rotation of the control knob, the stem can release the piston and open the device. The gas can then flow and is regulated by means of the piston forming a low-pressure chamber that regulates the opening through the seat. The control knob comprises a locking mechanism that prevents the device to be turned off after the flow begins. The pressure reducer can only be reset for reuse by a service entity. This pressure reducer is interesting in that it comprises a single shut-off device that fulfil the function of a shut-off valve and also a function of regulation when the pressure reducer is opened. The release of the device requires however a sophisticated and room consuming arrangement on top of the pressure reducer.

Prior art patent document published U.S. Pat. No. 6,047,727 discloses a valve assembly for gas cylinder. This valve assembly comprises a pressure reducer with a piston that is resiliently biased by a plurality of stacked cone disk springs, commonly named Belleville washers. A series of first cone disk springs is resting on a pair of second cone disk springs of a larger diameter. These two larger springs are arranged such that an adjustable cap member can act on the position of these springs, thereby influencing the pre-stress of the series of first cone disk springs. This teaching provides an interesting adjustment solution for a pressure reducer. It however does not provide any solution for holding the pressure reducer in a shut-off state and for releasing it.

SUMMARY OF INVENTION

Technical Problem

The invention has for technical problem to provide an improved device for regulating the pressure and/or flow of pressurized gas that can be held in a shut-off position and released therefrom. More particularly, the invention has for technical problem to provide an improved design with regard to compactness and/or cost manufacture for such a regulating device.

Technical Solution

The invention is directed to a device for regulating the pressure and/or flow of pressurized gas, comprising: a body with a gas inlet, a gas outlet and a gas passage connecting the outlet with the inlet; a gas shut-off device comprising a seat in the passage and a movable closure element cooperating with said seat; a piston carrying the closure element and delimiting with the body a low pressure chamber downstream of the shut-off device, the pressure in said chamber influencing the position of the piston and of the closure element relative to the seat so as to control the flow and/or pressure of the gas; wherein the body comprises: a first portion with the seat and the inlet; and a second portion housing the piston and delimiting the low pressure chamber; the second portion being movable relative to the first portion between a shut-off position where said portion urges the piston and the closure element against the seat in a shut-off state and an open position where the piston can move to control the flow and/or pressure of the gas.

According to a preferred embodiment of the invention, the second portion of the body comprises the outlet. Alternatively, the outlet could be on the first portion.

According to a preferred embodiment of the invention, the second portion of the body has a general cylindrical shape with one open end slidingly fitting on the first portion.

According to a preferred embodiment of the invention, the second portion of the body comprises an opposite end comprising the outlet.

According to a preferred embodiment of the invention, the low pressure chamber houses a resilient unit that is configured to be under compression between the second portion of the body and the piston when said second portion is in the shut-off position.

According to a preferred embodiment of the invention, the resilient unit is relieved of compression when the second portion is in the open position.

According to a preferred embodiment of the invention, the resilient unit comprises one or several Belleville washers.

According to a preferred embodiment of the invention, the second portion of the body comprises a stop surface configured to abut against the piston when said portion is moved in the shut-off position, the compressed resilient unit serving to compensate a matting of the contact surfaces of the closure element and the seat.

According to a preferred embodiment of the invention, the device comprises a resilient element, preferably a spring, interposed between the first portion of the body and the piston in order to exert a resilient force on the piston tending to open the shut-off device.

According to a preferred embodiment of the invention, the low-pressure chamber is delimited by a face of the piston that is opposed to the face that receives the resilient element.

According to a preferred embodiment of the invention, the piston comprises a protruding portion that is slidingly received in a bore of the first portion the body, the end of said protruding portion carrying the closure element.

According to a preferred embodiment of the invention, the protruding portion comprises an intermediate passage interconnecting the low pressure chamber with a cavity delimited by the bore in the first portion of the body.

According to a preferred embodiment of the invention, the second portion of the body comprises an open end slidingly fitting around the first portion and interlocking elements cooperating with the first portion and configured for limiting the movement of the second portion relative to the first one.

According to a preferred embodiment of the invention, the interlocking elements comprises pins, preferably screws, extending transversally, preferably perpendicularly, to a longitudinal axis of the device.

According to a preferred embodiment of the invention, the first portion of the body comprises on a lateral surface cavities receiving the pins or screws of the second portion.

According to a preferred embodiment of the invention, the cavities of the first portion of the body are configured to allow relative rotation of the second portion and comprise, each, a contact surface with one of the pins or screws and room for releasing said pin or screw.

According to a preferred embodiment of the invention, the device comprises one or several retaining elements for retaining the second portion of the body in the shut-off position, said retaining element(s) being configured so that they can be released by a manual operation in rotation of the second portion and/or traction preferably in a direction that is transversal to a longitudinal axis of the device.

According to a preferred embodiment of the invention, the second portion of the body is configured to move in translation, and preferably in rotation, relative to the first portion.

The invention is also directed to a valve for a gas cylinder comprising a valve body with a male thread for engaging in a cylinder neck, and a device for reducing the pressure of the gas in the cylinder, wherein the device is in accordance with the invention.

Advantages of the Invention

The invention is particularly interesting in that it provides a simple and compact construction for a device for regulating the pressure and/or flow of pressurized gas and that is able to serve as shut-off valve.

DESCRIPTION OF AN EMBODIMENT

Figure 1:
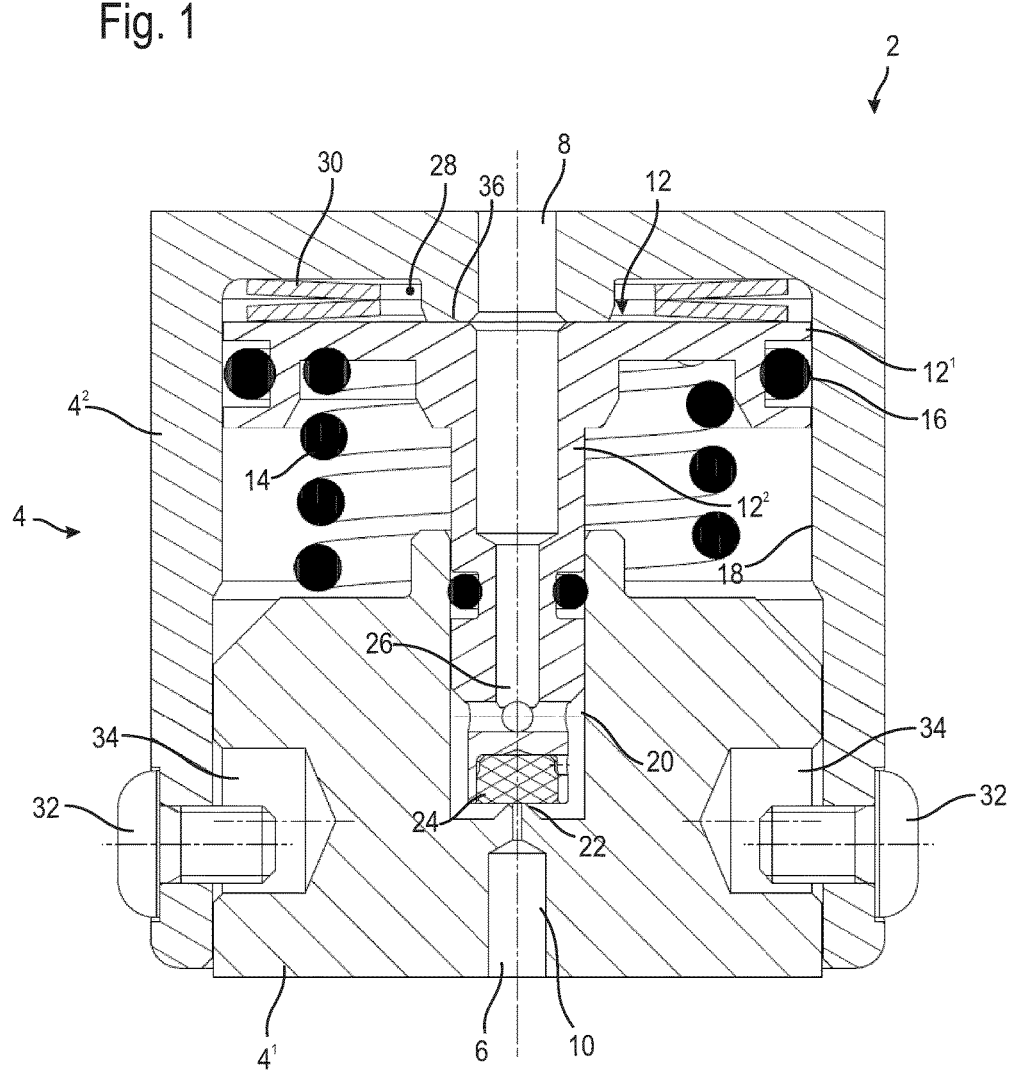
FIG. 1 is a sectional view of a device for reducing the pressure of a pressurized gas, the device being in accordance with the invention and in a shut-off state.
Figure 2:
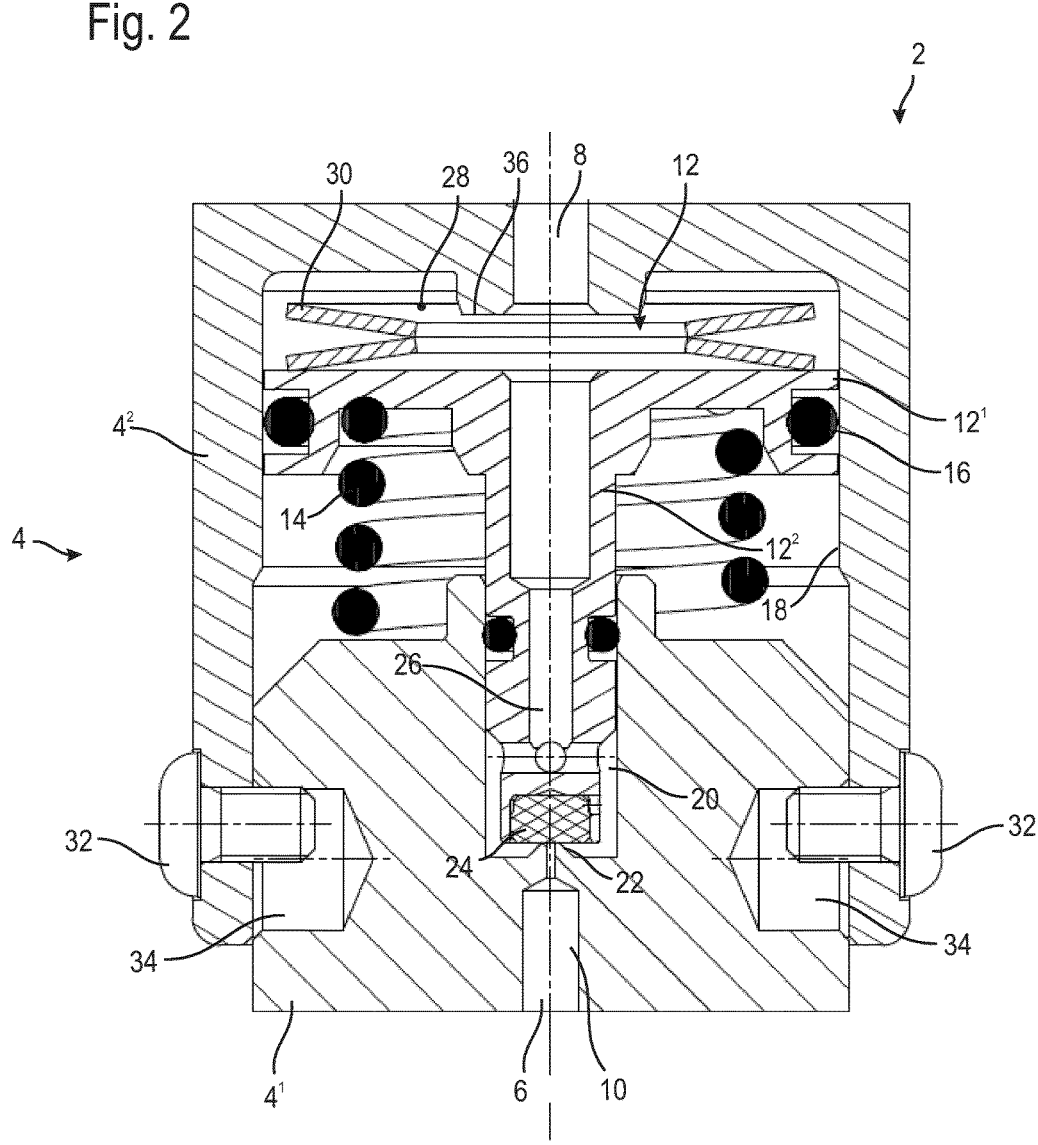
FIG. 2 is a sectional view of the device of FIG. 1, the device being however in an open state.

FIGS. 1 and 2 are sectional views of a device for reducing the pressure of a gas. FIG. 1 illustrates the device in a shut-off state whereas FIG. 2 illustrates the device in an open state.

As is visible in FIG. 1, the device 2 comprises a body 4 that is made of a first portion $4^1$ and a second portion $4^2$. The first portion $4^1$ comprises a gas inlet 6 and a passage 10 for the gas. The second portion $4^2$ is generally cap- or hood-shaped, fitting on the first portion $4^1$. It can comprise an outlet 8 at its top end. The second portion $4^2$ of the valve body 4 houses a piston 12 that essentially consists of a flat portion $12^1$ and a protruding portion $12^2$. The flat portion $12^1$ is preferentially circular and preferentially comprises a gasket 16 housed in a recess at its outer surface. This outer surface and the gasket 16 are slidingly received in the internal surface 18 of the second portion $4^2$ of the body 4. A spiral spring 14 is placed between the first portion $4^1$ of the body and the flat portion $12^1$ of the piston 12. The protruding portion $12^2$ carries at its end a closure element 24 that is configured to cooperate with a seat 22 in the gas passage 10. The seat 22 and the closure element 24 form a shut-off device that can shut-off the gas passage 10. The protruding portion $12^2$ is received in a sliding and gas thigh fashion in a bore 20 that is formed in the first portion $4^1$ of the body 4. It also comprises an intermediate passage 26 that interconnects the cavity of the bore 20 with a low pressure chamber 28.

The low pressure chamber 28 is delimited by the face of the piston 12 that is opposed to the face that receives the spring 14, and by the internal surface 18 of the second portion $4^2$. The low pressure chamber 28 houses a resilient unit that is composed in the present embodiment of two cone disk springs 30, commonly named Belleville washers. These two washers present opposite shapes so as to have a V-shaped cross section.

The second portion $4^2$ of the body 4 is generally cylindrical and comprises a free end that fits around the first portion $4^1$. This free end is therefore skirt shaped and comprises screws 32 that extend perpendicularly to the longitudinal axis of the pressure reducer 2. Each of these screws protrudes into a cavity 34 has provides enough room for the screw to move in a longitudinal direction that corresponds to the stroke of the second portion $4^2$ relative to the first one $4^1$.

FIG. 1 illustrates the device 2 in a shut-off state, i.e. where the gas passage 10 is shut-off. Indeed, in that state the second portion $4^2$ of the body 4 is in a position relative to the first portion $4^1$ where it urges the piston 12 towards the first portion $4^1$, more particularly where the closure element 24 is pressed against the seat 22. This urging effort is initially exerted by a stop surface 36 of the second portion $4^2$, in the low pressure chamber 28. This surface abuts indeed against the corresponding surface of the piston 12 initially when the second portion $4^2$ is moved towards the first one $4^1$ for bringing the device to its closed state. The urging effort is also exerted in parallel by the resilient unit 30 that is in a compressed state. After a while, the contact surfaces of at least one of the closure element 24 and the seat 22 can slightly deform due to surface matting. The resilient unit 30 permits to compensate such surface matting by exerting the necessary urging effort despite the possible loss of contact between the stop surface 36 and the piston 12. The stop surface 36 is interesting in that it provides a geometrical security means that the device is well in its shut-off state. Indeed, if the piston would block for any reasons, the contact between the stop surface 36 and the piston will prevent the second portion $4^2$ of the body to be brought into its shut-off position. This will therefore provide a clear feedback to the operator trying to bring the device in a shut-off state.

The characteristics of the resilient unit will of course be selected so as to keep the required gas tightness, these characteristics depending of course of the pressure at the inlet, the cross-section of the passage in the seat 22, the spring 14, the material of the closure element 24, etc.

FIG. 2 illustrates the device of FIG. 1 in an open state, or a pressure reducing state. Indeed, in FIG. 2 the second portion $4^2$ of the body 4 has moved away from the first one $4^1$. In the low pressure chamber 28 the resilient unit 30 is now released and does not contact the second portion $4^2$ anymore. The piston 12 can therefore regulate the pressure by means of the low pressure chamber 28. Indeed, the gas coming from the inlet 6 is laminated when passing through the shut-off device 22/24, this lamination depending on the relative position of the closure element 24 and the seat 22. The pressure of the gas in the cavity of the bore 20 is therefore reduced compared with the inlet pressure and is commonly named low pressure. Thanks to the intermediate passage 26, the pressure in the cavity of the bore 20 is essentially the same as in the low pressure chamber 28. Depending on the consumption of the gas at the outlet 8, the pressure in the low pressure chamber will influence the position of the closure element 24 in order to compensate a pressure reduction of decrease. This regulation principle as such is well-known from the skilled person and does not need to be further detailed.

As is visible also in FIG. 2, the screws 32 retaining the second portion $4^2$ of the body 4 have moved from a lower position in the cavities 34 to a higher position. More precisely, the screws 34 abut against uppers surfaces of the cavities 34, the second portion $4^2$ being maintained in this upper position by the effort resulting from the pressure of the gas in the low pressure chamber 28. Specific mechanical additional means can be provided for maintaining the second portion in that position.

The second portion $4^2$ of the body can move, relative to the first portion, in translation along the longitudinal axis of the device and optionally also in rotation. Indeed, the cavities 34 can be designed for providing the necessary space for the screws 32 (or any kind of pins or protruding elements) to move in translation and in rotation. For example, the cavities can comprise rest surfaces for retaining the second portion in the shut-off state and slots for allowing, first a rotational movement and, second a translational movement for releasing the second portion. Ramps can also be foreseen for reverting to the shut-off state by rotation of the second portion.

The invention claimed is:

1. A device for regulating the pressure and/or flow of pressurized gas, comprising:
    a body with a gas inlet, a gas outlet, and a gas passage connecting the outlet with the inlet;
    a gas shut-off device comprising:
        a seat in the passage, said seat being fixed, and a movable closure element cooperating with said seat; and
    a piston carrying the closure element and delimiting with the body a low pressure chamber downstream of the shut-off device, the pressure in said chamber influencing the position of the piston and of the closure element relative to the seat, so as to control the flow and/or pressure of the gas;
    wherein the body comprises:
        a first portion with the seat and the inlet; and
        a second portion housing the piston and delimiting the low pressure chamber; the second portion, as a whole, being movable relative to the first portion between a shut-off position where said portion urges the piston and the closure element against the seat in a shut-off state and an open position where the piston can move to control the flow and/or pressure of the gas.

2. The device according to claim 1, wherein the second portion of the body comprises the outlet.

3. The device according to claim 1, wherein the second portion of the body has a general cylindrical shape with one open end slidingly fitting on the first portion.

4. The device according to claim 3, wherein the second portion of the body comprises an opposite end comprising the outlet.

5. The device according to claim 1, wherein the low pressure chamber houses a resilient unit that is configured to be under compression between the second portion of the body and the piston when said second portion is in the shut-off position.

6. The device according to claim 5, wherein the device is structured and configured such that the resilient unit is relieved of compression when the second portion is in the open position.

7. The device according to claim 5, wherein the resilient unit comprises:
    one or several Belleville washers.

8. The device according to claim 5, wherein the second portion of the body comprises:
    a stop surface configured to abut against the piston when the second portion is moved in the shut-off position, the compressed resilient unit serving to compensate a matting of the contact surfaces of the closure element and/or the seat.

9. The device according to claim 1, further comprising:
    a resilient element interposed between the first portion of the body and the piston in order to exert a resilient force on the piston tending to open the shut-off device.

10. The device according to claim 9, wherein the low-pressure chamber is delimited by a face of the piston that is opposed to a face of said piston that receives the resilient element.

11. The device according to claim 1, wherein the piston comprises:
    a protruding portion that is slidingly received in a bore of the first portion of the body, an end of said protruding portion carrying the closure element.

12. The device according to claim 11, wherein the protruding portion of the piston comprises:
    an intermediate passage interconnecting the low pressure chamber with a cavity delimited by the bore in the first portion of the body.

13. The device according to claim 1, wherein the second portion of the body comprises:
    an open end slidingly fitting around the first portion and interlocking elements cooperating with the first portion and configured for limiting the movement of the second portion relative to the first portion.

14. The device according to claim 13, wherein the interlocking elements comprise:
    pins extending transversally to a longitudinal axis of the device.

15. The device according to claim 1, wherein the second portion of the body is configured to move in translation and in rotation relative to the first portion.

* * * * *